US012644623B2

(12) United States Patent
Hasenkamp

(10) Patent No.: US 12,644,623 B2
(45) Date of Patent: Jun. 2, 2026

(54) FLOW HEATER FOR AUTOMOBILES

(71) Applicant: BorgWarner Ludwigsburg GmbH, Ludwigsburg (DE)

(72) Inventor: Johannes Hasenkamp, Schwieberdingen (DE)

(73) Assignee: BorgWarner Ludwigsburg GmbH, Ludwigsburg (DE)

( * ) Notice: Subject to any disclaimer, the term of this patent is extended or adjusted under 35 U.S.C. 154(b) by 901 days.

(21) Appl. No.: 17/839,835

(22) Filed: Jun. 14, 2022

(65) Prior Publication Data

US 2022/0404064 A1    Dec. 22, 2022

(30) Foreign Application Priority Data

Jun. 18, 2021    (DE) ..................... 10 2021 115 797.8

(51) Int. Cl.
F24H 1/10        (2022.01)
B60H 1/22        (2006.01)

(52) U.S. Cl.
CPC ........... F24H 1/102 (2013.01); B60H 1/2221 (2013.01)

(58) Field of Classification Search
None
See application file for complete search history.

(56) References Cited

U.S. PATENT DOCUMENTS

| | | | | |
|---|---|---|---|---|
| 1,985,830 | A | * | 12/1934 | Lee .......................... F24H 1/102 392/471 |
| 5,438,642 | A | * | 8/1995 | Posen ................... F24H 9/2028 392/491 |
| 8,946,599 | B2 | * | 2/2015 | Niederer ............... F24H 3/0464 219/205 |
| 10,302,331 | B2 | * | 5/2019 | Kohl ..................... B60H 1/2221 |
| 10,806,022 | B2 | * | 10/2020 | Lim .................. H05K 7/20872 |
| 11,760,165 | B2 | * | 9/2023 | Chu .................... B60H 1/00878 165/202 |
| 12,158,286 | B2 | * | 12/2024 | Sprygada ................ F24H 1/009 |
| 2005/0047768 | A1 | * | 3/2005 | Kuebler ................... H05B 3/78 219/202 |
| 2015/0131979 | A1 | * | 5/2015 | Kohl ......................... F24H 9/14 392/479 |
| 2016/0069588 | A1 | * | 3/2016 | Kominami .............. F24H 1/142 236/35 |
| 2016/0360574 | A1 | * | 12/2016 | Bohlender .............. H05B 3/04 |

(Continued)

FOREIGN PATENT DOCUMENTS

DE        10 2017 121 341 B4        9/2019

*Primary Examiner* — Thor S Campbell
(74) *Attorney, Agent, or Firm* — Bose McKinney & Evans LLP

(57)        ABSTRACT

Disclosed is a flow heater for automobiles. The flow heater has a metal housing surrounding a housing interior and a flow channel configured for liquid to be heated is disposed in the housing interior and extends from a liquid inlet to a liquid outlet. A heating resistor is arranged in the housing interior and is configured to heat liquid flowing from the liquid inlet to the liquid outlet. A wall separates the flow channel from a dry part of the housing interior, and control electronics are arranged in the dry part of the housing interior. A metal housing cover is provided that has a peripheral groove into which the metal housing engages. The peripheral groove contains adhesive that bonds the housing cover to the metal housing.

10 Claims, 2 Drawing Sheets

(56)  References Cited

U.S. PATENT DOCUMENTS

| | | | | |
|---|---|---|---|---|
| 2018/0160480 | A1* | 6/2018 | Bohlender | H05B 1/0236 |
| 2019/0077224 | A1 | 3/2019 | McCarthy et al. | |
| 2019/0120563 | A1* | 4/2019 | Nguyen | F28D 9/0056 |
| 2020/0039324 | A1* | 2/2020 | Adachi | F24H 1/10 |
| 2020/0062082 | A1* | 2/2020 | Hermida Domínguez | |
| | | | | H05B 1/0236 |
| 2020/0156443 | A1* | 5/2020 | Ding | H05B 3/42 |
| 2020/0317027 | A1* | 10/2020 | Chu | F24H 1/121 |
| 2021/0054819 | A1* | 2/2021 | Kachelhoffer | F24H 9/1872 |
| 2021/0070147 | A1* | 3/2021 | Chae | H01H 37/52 |
| 2021/0148606 | A1* | 5/2021 | Wulff | F24H 1/121 |

* cited by examiner

FLOW HEATER FOR AUTOMOBILES

RELATED APPLICATIONS

This application claims priority to DE 10 2021 115 797.8, filed Jun. 18, 2021, the entire disclosure of which is hereby incorporated herein by reference.

BACKGROUND

This disclosure relates to a flow heater for automobiles. A flow heater generally of the type disclosed herein is known in the art from DE 10 2017 121 341 B4.

Flow heaters are needed in automobiles, in order to heat various liquids, in particular water, or aqueous solutions. The constant objectives in the development of flow heaters for automobiles are a compact design, low manufacturing costs, a high level of reliability and a high efficiency, such that a large amount of fluid can be heated in a short time.

SUMMARY

This disclosure teaches a way to achieve these objectives to an even greater extent.

A flow heater in accordance with this disclosure has a metal housing, in which are arranged an electrical heating resistor and control electronics, and a housing cover made of metal, which is adhesively bonded to the metal housing. For this purpose, the metal housing has a peripheral groove, into which the housing cover protrudes, and in which adhesive is arranged. In this way, a sealed connection between the housing cover and the metal housing can be achieved at low cost, so that the control electronics in the metal housing are reliably protected from spray water and similar environmental influences. In addition, the adhesive bonding ensures that unauthorised opening is made more difficult and, where appropriate, can easily be detected. This means that there is no need for a complex seal or a tamper-proof screw connection.

Suitable adhesives include moisture-curing adhesives, heat-curing adhesives and two-component adhesives. Silicone-based adhesives are particularly suitable.

In an advantageous refinement of this disclosure, provision is made for the housing cover, and/or one or both side walls of the peripheral groove, to have clamping ribs. Advantageously, an electrical contact between the metal housing and the housing cover can thereby be reliably ensured with little effort. Earthing of the outer face of the flow heater is thus possible without any difficulty, which is important for safety reasons at operating voltages of 200 V or more. Both side walls of the peripheral groove are preferably provided with clamping ribs that abut against the housing cover. The cover can then be manufactured inexpensively as a sheet metal part.

In another advantageous refinement of this disclosure, provision is made for the housing cover to have a bent edge section, which is arranged in the peripheral groove. In the course of assembly, the housing cover can then be pressed against the metal housing, such that the edge section is seated in the peripheral groove and a section of the cover adjacent to the edge section abuts against a side wall of the peripheral groove.

In another advantageous refinement of this disclosure, provision is made for the heating resistor to be in the form of one or a plurality of conductor tracks arranged on a metal plate. The metal plate can, for example, support an electrically insulating layer, such as an oxide layer, to which the conductor tracks are then applied, for example, by printing or spraying. The metal plate can advantageously be arranged in the metal housing such that it bounds the flow channel, which guides the liquid to be heated from the liquid inlet to the liquid outlet of the metal housing. In operation, the liquid to be heated then flows along one surface of the metal plate, while an opposite side of the metal plate remains dry while in operation.

A dry part of the housing interior, in which the control electronics are arranged, can thereby be separated from the flow channel by a metal plate supporting the heating resistor. In this case, the metal plate supporting the heating resistor thus forms a wall of the flow heater. However, the dry part of the interior of the housing, in which the control electronics are arranged, can also be separated from the flow channel by another wall, such as a wall designed integrally with the metal housing. The flow channel can, for example, extend between the metal plate supporting the heating resistor, and a wall designed integrally with the metal housing, which is parallel to the metal plate, within manufacturing tolerances.

Although the term "cover" often refers to a component that later sits on top of a device, the component referred to as a housing cover, in the context of the description of this disclosure, can be arranged in any spatial orientation relative to the metal housing of the flow heater, and can also be attached to the metal housing of the flow heater "underneath," for example.

In another advantageous refinement of this disclosure, provision is made for the metal housing to support a housing cover on two opposite sides. The metal housing then has a peripheral groove on each of two opposite sides, into each of which grooves one of the two housing covers engages, and is held there by means of adhesive.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following description. Rather, the embodiments are chosen and described so that others skilled in the art may appreciate and understand the principles and practices of this disclosure.

Figure 1:
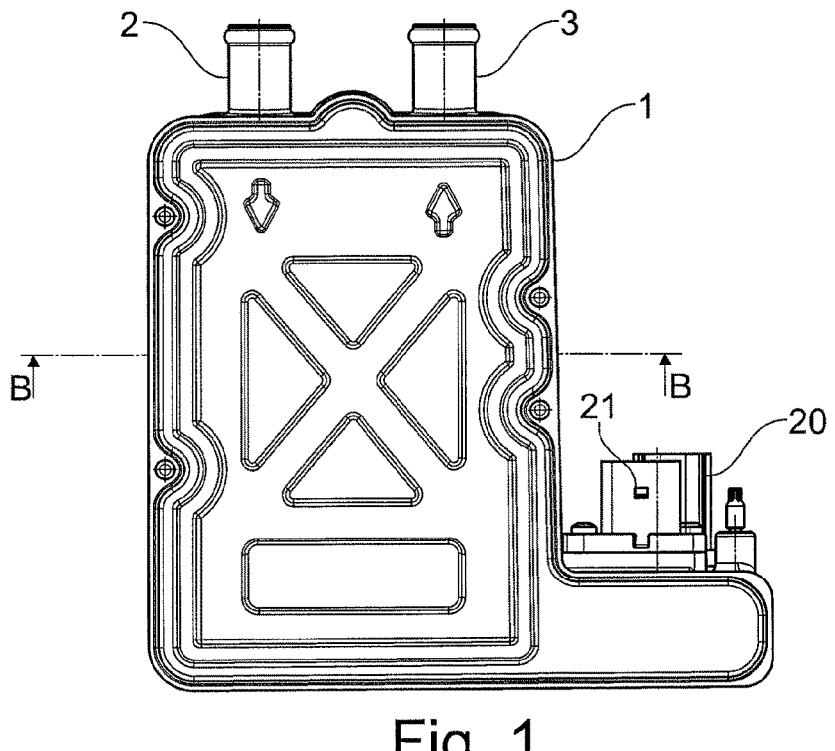
FIG. 1 shows an example of embodiment of a flow heater in accordance with this disclosure.
Figure 2:
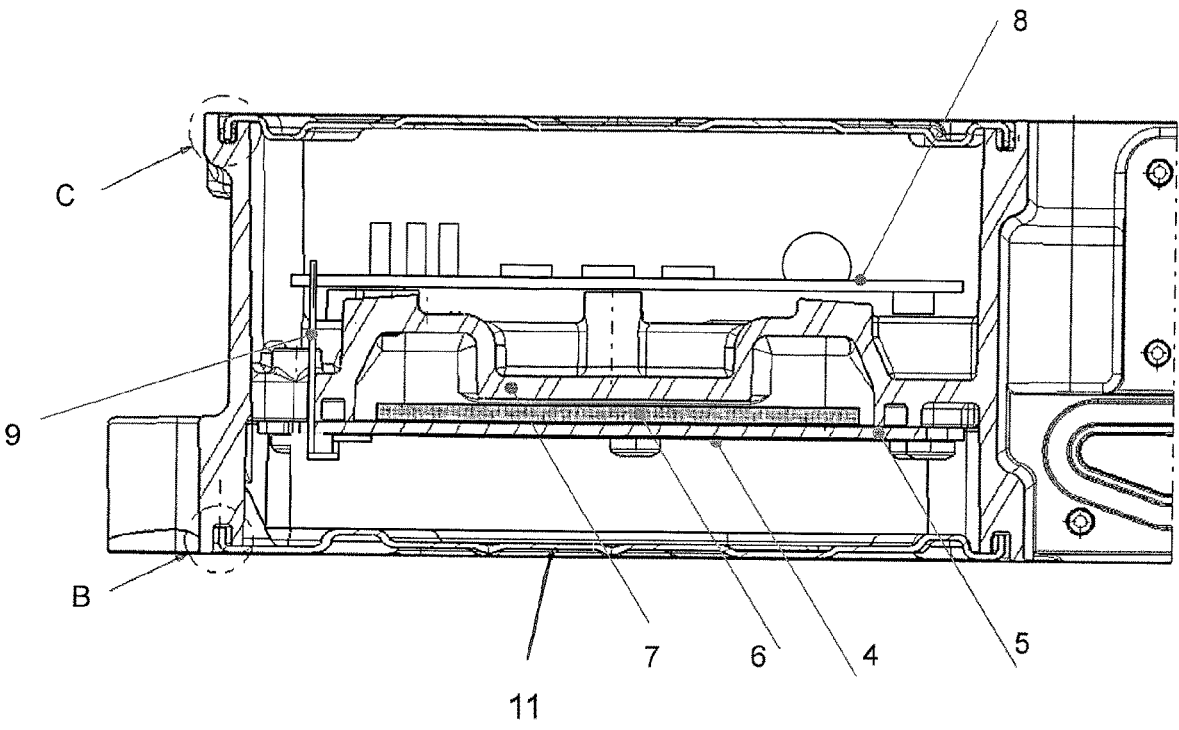
FIG. 2 shows a sectional view of FIG. 1.

FIG. 1 shows a flow heater for automobiles, with which water, or aqueous liquids, can be heated. FIG. 2 shows a sectional view of this flow heater along the section line BB. The flow heater 1 has a metal housing 1, which has a liquid inlet 2 and a liquid outlet 3, and supports various electrical plug-in connectors 20, 21, for example, a plug-in connector for supplying the flow heater with high voltage, for example, 200 V to 800 V, and a plug-in connector for communication with a control unit of an automobile.

In the metal housing 1 is arranged an electrical heating resistor 4, which can be designed, for example, as a conductor track on a metal plate 5. A suitable heating resistor can, for example, be designed as a sprayed or printed layer, which lies on an electrically insulating intermediate layer, such as an oxide layer. The metal plate 5 can support heat dissipation elements 6, for example corrugated sheet metal fins, in order to improve heat dissipation to a liquid to be heated.

In an interior space surrounded by the metal housing 1, a flow channel extends from the liquid inlet 2 to the liquid outlet 3, which flow channel guides liquid to be heated past the metal plate 5. In the example of embodiment shown, a section of the flow channel extends between the metal plate 5 and a wall 7 of the metal housing 1. The wall 7 thus separates the flow channel from a dry part of the interior of the housing, in which control electronics 8 are arranged, for example in the form of a circuit board with electronic components. The control electronics 8 can, for example, be electrically connected to the heating resistor 4 by way of a contact pin 9.

The metal housing 1 supports a housing cover 10 made of metal, which closes off the dry part of the housing interior, and covers the control electronics 8 arranged therein. On an opposite side, the metal housing 1 can support a second housing cover 11 made of metal.

Figure 3:
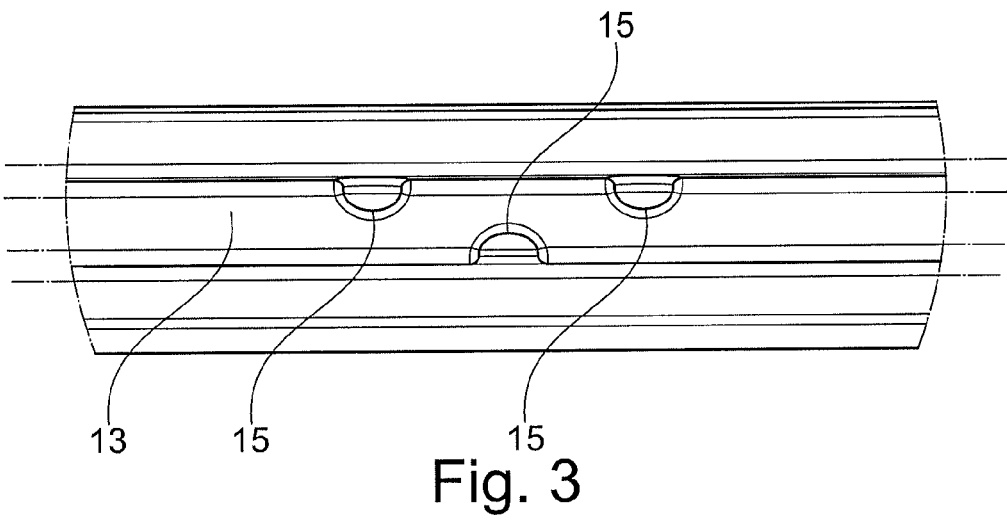
FIG. 3 shows a schematic detail of the metal housing of the flow heater.
Figure 4:
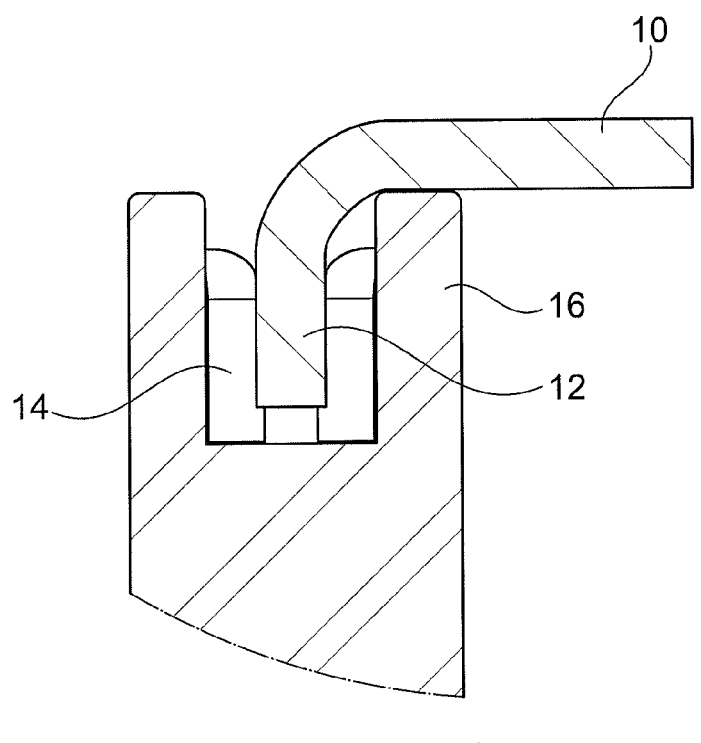
FIG. 4 shows a sectional view of a detail of the flow heater.

The housing cover 10 and the housing cover 11 in each case have a bent edge section 12, which engages into a peripheral groove 13 of the metal housing 1. FIG. 3 shows a detail of such a groove 13, and FIG. 4 shows a schematic sectional view of the groove 13 with a housing cover 11.

The grooves 13 are filled with adhesive 14, for example a silicone-based adhesive. The housing covers 10, 11 are thus adhesively bonded to the metal housing 1. The side walls of the grooves 13 can have clamping ribs 15, which abut against the bent edge section 12 of the housing cover 10, 11. Advantageously, this ensures electrical contact between the metal housing 1 and the housing covers 10, 11, which simplifies earthing.

In the course of assembly, adhesive is first filled into a peripheral groove 12 of the metal housing 1, and the housing cover 10, 11 is then positioned on the metal housing 1. The bent edge section is pressed into the groove 12 and the adhesive 14, until the housing cover 10, 11 abuts against a wall 16 of the peripheral groove 12. The metal housing 1 can thus advantageously be closed in an air- and liquid-tight manner with little effort and, in particular, a large sealing path can be implemented in a small space.

The support of the housing cover 10, 11 on a peripheral (inner) wall 16 proves to be advantageous, both for the assembly (fixed stop), and also for a timely sealing test. The lower edge of the housing cover 10 has manufacturing tolerances, which are accommodated by a gap. The gap between the housing cover 10, 11 and the groove base is dimensioned such that at this position the housing cover 10, 11 is peripherally wetted in all cases by adhesive 14, so that the longest possible sealing path is created.

The deflection of the sealing path through 180° around the immersed edge of the housing cover 10, 11 additionally increases the security against external impact of sharp objects, or a strong water jet. The clamping ribs 15 also undertake the centring of the housing cover 10, 11 with respect to the metal housing 1.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE SYMBOLS

1 Metal housing
2 Liquid inlet
3 Liquid outlet
4 Heating resistor
5 Metal plate
6 Heat dissipation element
7 Wall
8 Control electronics
9 Contact pin
10 Housing cover
11 Housing cover
12 Edge section
13 Groove
14 Adhesive
15 Clamping rib
16 Wall
20 Plug-in connector
21 Plug-in connector

What is claimed is:

1. A flow heater for automobiles, comprising:
a metal housing surrounding a housing interior;
a flow channel configured for liquid to be heated disposed in the housing interior and extending from a liquid inlet to a liquid outlet;
a heating resistor arranged in the housing interior and configured to heat liquid flowing from the liquid inlet to the liquid outlet;
a wall separating the flow channel from a dry part of the housing interior;
control electronics arranged in the dry part of the housing interior; and
the metal housing having a peripheral groove into which a metal housing cover engages, the peripheral groove containing adhesive that bonds the housing cover to the metal housing and wherein a wall of the peripheral groove of the metal housing and/or the housing cover has clamping ribs that establish an electrical contact between the metal housing and the housing cover.

2. The flow heater according to claim 1, wherein both side walls of the peripheral groove have clamping ribs which abut against and establish contact with the housing cover.

3. The flow heater according to claim 1, wherein the housing cover is bonded to the metal housing with a silicone-based adhesive.

4. The flow heater according to claim 1, wherein the housing cover abuts one of the two side walls of the groove.

5. The flow heater according to claim 1, wherein the heating resistor comprises a conductor track on a metal plate that bounds the flow channel.

6. The flow heater according to claim 5, wherein the flow channel extends between the wall and the metal plate.

7. The flow heater according to claim 1, wherein the housing cover has a bent edge section arranged in the peripheral groove.

8. The flow heater according to claim 1, wherein the metal housing, on a side opposite the housing cover, has a second peripheral groove into which an edge region of a second cover engages, and the edge region of the second cover is adhesively bonded to the metal housing in the second peripheral groove.

9. The flow heater according to claim 1, wherein the metal housing supports a first plug-in connector for connection to a high voltage source, and a second plug-in connector for communication with a control unit of an automobile.

10. The flow heater according to claim 2, wherein the housing cover has a bent edge section arranged in the peripheral groove and the bent edge is centered in the peripheral groove by the clamping ribs.

\* \* \* \* \*